United States Patent [19]

Greengrass

[11] 4,096,304

[45] Jun. 20, 1978

[54] REINFORCED FLEXIBLE PANELS

[75] Inventor: Michael Greengrass, Norwich, England

[73] Assignee: Flexipane Limited, Norwich, England

[21] Appl. No.: 792,803

[22] Filed: May 2, 1977

[51] Int. Cl.$^2$ .................. B32B 15/08; B32B 15/12; B32B 15/14; B32B 17/06

[52] U.S. Cl. .................................. 428/138; 428/233; 428/236; 428/247; 428/255; 428/256; 428/293; 428/294

[58] Field of Search ............ 428/138, 236, 247, 255, 428/256, 293, 294, 233

[56] References Cited

U.S. PATENT DOCUMENTS

| | | | |
|---|---|---|---|
| 1,387,011 | 8/1921 | Ratcliff | 428/138 |
| 1,611,031 | 12/1926 | Henderson | 428/236 |
| 1,890,504 | 12/1932 | Ferguson | 428/233 |
| 3,862,877 | 1/1975 | Camden | 428/233 |
| 3,935,355 | 1/1976 | Kuhn | 428/138 |

FOREIGN PATENT DOCUMENTS

| | | | |
|---|---|---|---|
| 569,210 | 1/1959 | Canada | 428/233 |
| 865,250 | 4/1961 | United Kingdom. | |
| 1,338,452 | 11/1973 | United Kingdom. | |
| 1,368,376 | 9/1974 | United Kingdom. | |
| 1,394,256 | 5/1975 | United Kingdom | 428/233 |

*Primary Examiner*—J.C. Cannon
*Attorney, Agent, or Firm*—Allegretti, Newitt, Witcoff & McAndrews

[57] ABSTRACT

A fire-retardant sheet comprising, as four superposed layers, a fire-retardant paper sheet, coated on one surface with a plastic material and on the other surface with a metal foil and having a scrim of fibreglass between the foil and paper, said sheet additionally comprising a further plastic sheet or layer laminated thereto with the interposition of a mesh.

11 Claims, 9 Drawing Figures

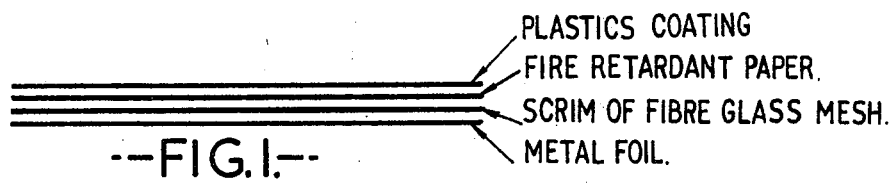
—FIG. 1.—
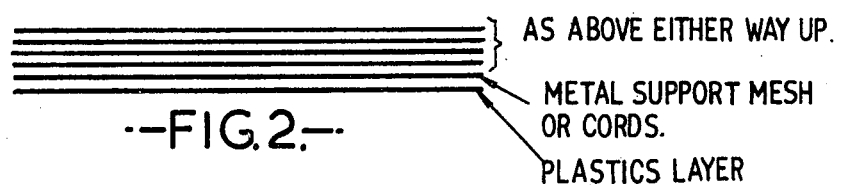
—FIG. 2.—
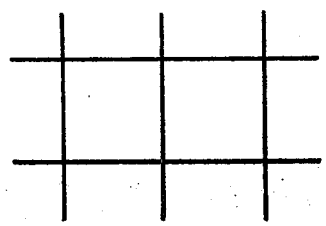
—FIG. 3A.—
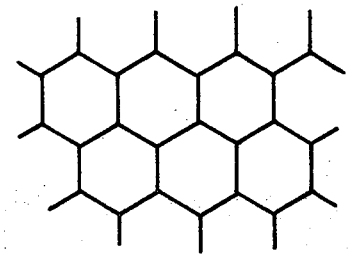
—FIG. 3B.—
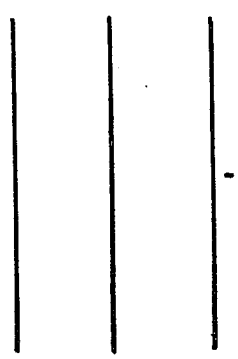
—FIG. 3C.—

—FIG. 4A.—
—FIG. 4B.—
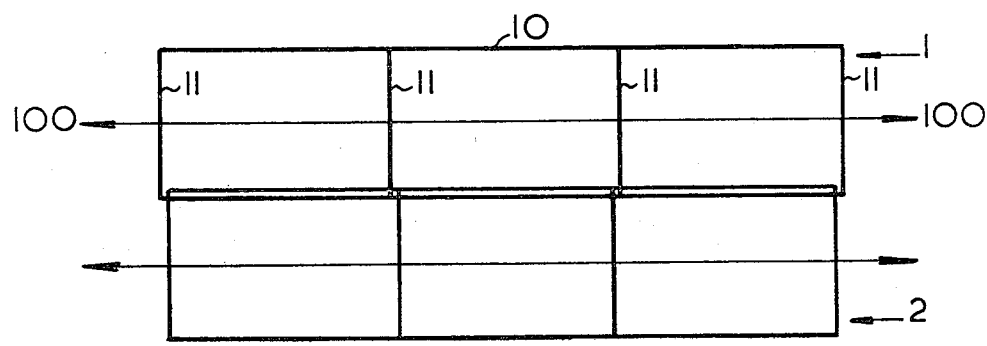
—FIG. 5A.—
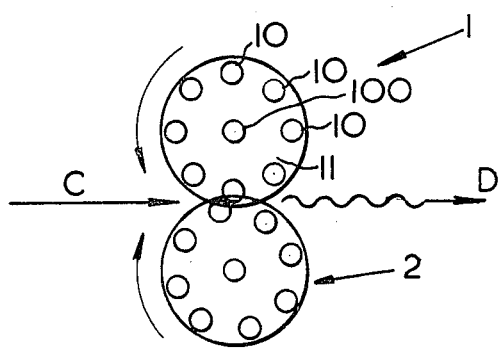
—FIG. 5B.—

REINFORCED FLEXIBLE PANELS

BACKGROUND OF THE INVENTION

The present invention relates to reinforced flexible panels and to a method and means of corrugating them.

There exists a need and demand in the building and construction industry for flexible sheets of water-impermeable and insulating material with a degree of inherent strength, whereby said sheets may be self-supporting. Many known plastic sheets variously suffer from the disadvantage of being flimsy, inflammable, poor insulators and awkward to use as construction materials. It is an object of the present invention to provide improvements over the art.

There is known and sold, for instance as Sisalkraft 310, a reinforced flame retardant sheet which serves as a moisture and vapour barrier and is foil faced to provide reflective insulation. The general nature of such a known sheet in cross section is shown in FIG. 1 of the accompanying drawings, the four layers of the sheet being shown separated in exaggerated form for clarity. A fire retardant paper sheet is coated on one surface with a plastic material and on the other surface with a metal foil, a scrim of fiberglass mesh being sandwiched between the foil and paper. As will be evident, such a sheet, although fire retardant and reflective, has no inherent strength, is in no way self-supporting and is awkward to use and secure as a construction material.

It is a more specific object of the invention to provide an improvement over such known sheets.

SUMMARY OF THE INVENTION

According to one aspect of the invention, there is provided a fire retardant sheet of the type specified above, with a further plastic sheet or layer laminated thereto with the interposition of either a metal support mesh or a mesh of cords. The sheet, when reinforced with a metal support, is self-supporting and the sheet, when reinforced with a mesh of cords, for instance of nylon, is readily supportable by attachment of the cord ends to support members, such as beams or the like.

The metal support mesh may be of rectangular form or of diamond form, as desired, and the nylon mesh may comprise simple linear strands or a cross-matrix of such strands.

It should be noted that where reference is made herein to the provision of a metal support mesh or cords over the metal foil surface of the fire retardant sheet, it is equally possible to provide a said mesh or cords over the plastic coated surface of the fire retardant sheet. Likewise, it is considered advantageous to use a sheet of fire retardant polythene as the plastic laminate which sandwiches the support mesh or cords to the foil or plastic coated surface. For details of a suitable sandwiching and lamination technique, reference is directed to previous applications, and patents including British Pat. No. 865,250, British Pat. No. 1,338,452 and British Pat. No. 1,368,376 which are incorporated herewith by reference.

According to another aspect of the invention, there is provided a machine when used for corrugating a said sheet with a metal support mesh. Such a machine comprises a pair of freely rotatable compression members, each said compression member taking the form of a plurality of rods arranged around and parallel to a central pivotal axis, the pivotal axes of the two members being arranged mutually parallel and at such a spacing that the rods of one member intermesh with the rods of the other. In this manner, when one member is turned about its axis the other member is also turned and there is generated by the rods of the members an intermittent nip. If a metal reinforced sheet as previously referred to is passed through this nip, then it will emerge corrugated from the other side.

BRIEF DESCRIPTION OF THE DRAWINGS

In order that the invention may be more readily understood, reference will now be made to the accompanying drawings which are given by way of example, and in which:

FIG. 1, as previously explained, illustrates in exaggerated cross section separation the component parts of reinforced flame retardant barrier paper with a foil face as marketed under the trademark Sisalkraft 310;

FIG. 2 shows, in similarly exaggerated form, the paper sheet of FIG. 1 incorporating an improvement according to the present invention;

FIG. 3A shows schematically a rectangular metal support mesh;

FIG. 3B shows schematically a diamond metal support mesh; and

FIG. 3C shows schematically a linear arrangement of nylon cords, as may be additionally or alternatively sandwiched by the plastic layer as shown in FIG. 2;

FIG. 4A shows in generally side view a flat sheet according to the invention; and FIG. 4B shows in side view a sheet according to the invention after corrugation;

FIG. 5A shows a corrugating machine according to the present invention in schematic plan view; and FIG. 5B shows the machine of FIG. 5A in side view.

DESCRIPTION OF THE PREFERRED EMBODIMENT

In FIG. 1 there is shown a sheet of Sisalkraft 310 or similar material (fire resistant paper covered on one surface with a plastic coating and on the other surface with a metal foil sandwiching a scrim of fibreglass mesh). In FIG. 2, there is shown the sheet of FIG. 1, but with the additional provision of a metal support mesh or arrangement of cords, for instance of nylon, sandwiched by a plastic laminate layer. It is envisaged as possible that the plastic laminate layer and support mesh or cords may be provided on either surface of the sheet.

FIGS. 3A and B show, in generally schematic form, two possible types of metal support mesh which may be sandwiched to the sheet and FIG. 3C shows a small section of linear nylon cords which may likewise be sandwiched.

In FIG. 4 there is shown the manner in which a sheet according to the invention is corrugated by the machine of FIG. 5 to give added structural strength. In FIG. 5 there is shown a first compression member 1, which comprises a plurality (preferably 12) of elongated metal rods 10 secured by spacers 11 at equal distances from, and at equal angles around, a rotary axis 100. The rotary axis also conveniently takes the form of an elongated metal rod mounted in end bearings. The member 1 is freely rotatable by hand and meshes with a compression member 2 which is exactly, or substantially exactly, similar to the member 1. Thus, rotation of one member by hand in the direction of the associated curved arrow also rotates the other member in the direction of the associated curved arrow. As shown, there is thus generated between the two members an intermittent nip, so that a sheet introduced as at arrow C is drawn through the machine and emerges as at arrow D in corrugated form. An advantage of the arrangement shown is that the rods 10 may be of substantial length because one compression member generally supports the other along the length of the rods. Also, the members do not require heating or a motorized drive.

Corrugated sheets, according to the invention, have good inherent strength and may be used for roofing or other self-supporting purposes. Sheets provided with cords can also be used for roofing and other purposes where it is convenient to secure them by knots. Sheets, according to the invention, constitute a barrier to heat, water and vapour and may be used for insulating tanks, pipes or wall cavities and the like. Because the corrugating arrangement described runs cold, the corrugation does not damage the material of the sheet.

I claim:

1. A fire-retardant sheet comprising, as four superposed layers, a fire-retardant paper sheet, coated on one surface with a plastic material and on the other surface with a metal foil and having a scrim of glass reinforced fibre between the foil and paper, said sheet additionally comprising a further plastic sheet or layer laminated thereto, a mesh being interposed between said paper sheet and said plastic sheet or layer.

2. A fire-retardant sheet as recited in claim 1, wherein the mesh and laminate are provided over the metal foil surface.

3. A fire-retardant sheet as recited in claim 1, wherein the mesh and laminate are provided over the plastic coated surface.

4. A fire-retardant sheet as recited in claim 1, wherein the plastic laminate which sandwiches the mesh to the foil or plastic coated surface is a sheet of fire-retardant polythene.

5. A fire-retardant sheet as recited in claim 1, wherein the interposed mesh is in the form of a metal support mesh.

6. A fire-retardant sheet as recited in claim 5, wherein the metal support mesh is of rectangular form.

7. A fire-retardant sheet as recited in claim 5, wherein the metal support mesh is of diamond-form.

8. A fire-retardant sheet as recited in claim 1, wherein the interposed mesh is a mesh of cords.

9. A fire-retardant sheet as recited in claim 8, wherein the mesh of cords is of nylon.

10. A fire-retardant sheet as recited in claim 8, wherein the mesh comprises linear strands.

11. A fire-retardant sheet as recited in claim 8, wherein the mesh comprises a cross matrix of strands.

* * * * *